Aug. 30, 1949.  A. B. DUNLOP  2,480,454
APPARATUS FOR PREPARING INVESTMENT MATERIALS
Filed May 5, 1947

INVENTOR.
ALEX B. DUNLOP.
BY
ATTORNEYS.

Patented Aug. 30, 1949

2,480,454

UNITED STATES PATENT OFFICE 2,480,454

APPARATUS FOR PREPARING INVESTMENT MATERIALS

Alex B. Dunlop, Detroit, Mich., assignor to Kerr Manufacturing Company, Detroit, Mich., a corporation of Michigan Application May 5, 1947, Serial No. 746,078

1 Claim. (Cl. 183—2.5)

The invention relates to investment molds and, more particularly, to the preparation of investment materials for use in said molds. It is the object of the invention to eliminate air which is entrapped by the investment material while still in a fluid state and before introduction into the mold. To this end the invention consists, first in the method and, second, in the apparatus as hereinafter set forth.

Certain materials used in forming investment molds such, for instance, as plaster of Paris and like substances contain, when mixed with water and still in a fluid state, a large quantity of entrapped air. If this is permitted to remain in the mixture the mold subsequently formed thereof will be unsatisfactory as it will contain a great number of air filled cavities. It has, therefore, been the practice to subject this fluid mixture to a vacuum treatment which eliminates the major portion of the air. However, if the fluid mixture is fairly viscous the air in boiling out therefrom will form a foam and after the air has been eliminated the foam structure will still be retained with a great number of empty cells therein. When normal atmospheric pressure is restored these cells will refill with air and thus it will be retained by the mixture during the forming of the mold. With my improved process and apparatus such re-absorption of air is prevented as follows.

Figure 1:
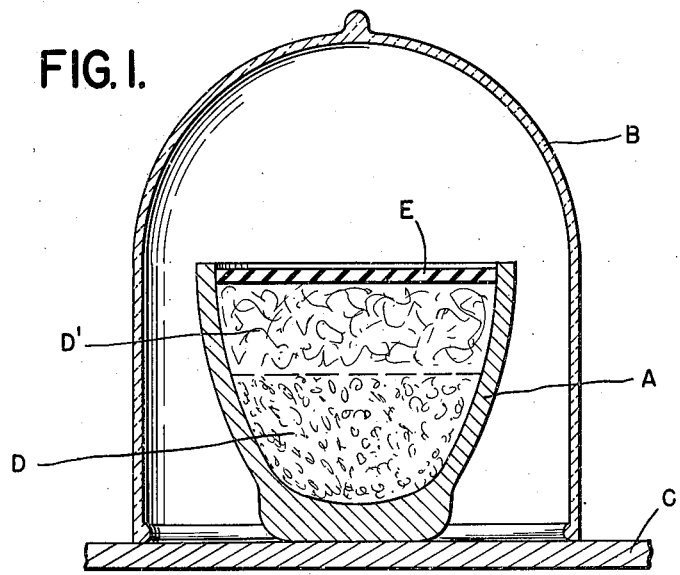
Fig. 1 is a vertical central section through the container for the investment material together with the surrounding casing forming the chamber in which the material is vacuumized.
Figure 2:
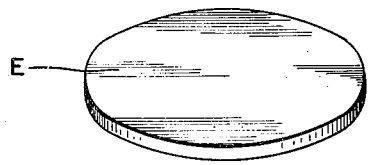
Fig. 2 is a perspective view of the flexible disk or diaphragm used in connection with the container.
Figure 3:
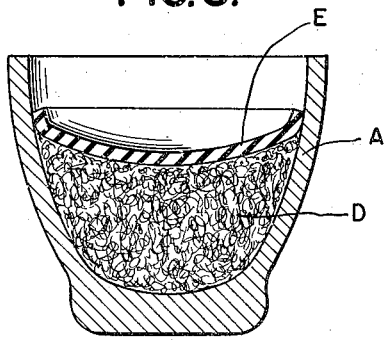
Fig. 3 is a view similar to a portion of Fig. 1 showing the container after the material has been vacuumized and with the disk or diaphragm collapsed over the material to prevent re-absorption of air.

As illustrated in Figs. 1 and 3, A is a suitable container in which the investment material is mixed with water or other fluid and in quantities suitable for the particular mold to be formed thereby. This container may be a mortar formed either of flexible material, such as rubber, or of a rigid material but provided with the upwardly flaring sidewalls. B is the bell of an air pump beneath which the container A is placed upon a base C. D represents a quantity of the commingled investment material and water occupying the lower portion of the container A and D' represents the foam which will rise from the fluid when the air is boiling out therefrom. To avoid retaining this foam as a cellular structure which will re-fill with air when atmospheric pressure is restored, I have provided a disk or diaphragm E formed of rubber, or rubber-like, flexible and resilient material. This may be placed upon or near the top of the container A to rest lightly thereon and during the vacuumizing it will be raised sufficiently for the escape of air around its periphery. As soon, however, as atmospheric pressure is restored within the bell B air pressure on the top of the diaphragm E will press it downward collapsing all of the cellular structure therebeneath and pressing it firmly against the upper surface of the fluid mixture. Thus, the mixture will be completely free from entrapped air and in a condition for filling into the mold to invest the pattern.

What I claim as my invention is:

Apparatus for vacuumizing fluid investment materials comprising a container for the fluid investment material having an upwardly flaring sidewall and a flexible disk or diaphragm supported by the flaring wall of said container, to be spaced above the fluid investment material therein, said disk being adapted to be raised by air pressure within the container during vacuum treatment to permit escape of the air and being also sufficiently flexible to collapse under restored atmospheric pressure and to be pressed downward against the body of the investment material breaking down any foam or cellular structure thereof.

ALEX B. DUNLOP.

REFERENCES CITED

The following references are of record in the file of this patent:

UNITED STATES PATENTS

| Number | Name | Date |
|---|---|---|
| 1,345,380 | McColl et al. | July 6, 1920 |
| 2,183,763 | Brown et al. | Dec. 19, 1939 |
| 2,416,506 | Vest | Feb. 25, 1947 |